United States Patent
Terada

(10) Patent No.: US 6,247,854 B1
(45) Date of Patent: *Jun. 19, 2001

(54) CAMERA HAVING DISTORTION-RESISTANT BODY MEMBER

(75) Inventor: Shuichi Terada, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,934

(22) Filed: Oct. 16, 1998

(30) Foreign Application Priority Data

Oct. 24, 1997 (JP) .................................................. 9-309565

(51) Int. Cl.⁷ .................................................. G03B 17/00
(52) U.S. Cl. .......................................... 396/440; 396/535
(58) Field of Search .............................. 396/6, 440, 541, 396/535

(56) References Cited

U.S. PATENT DOCUMENTS

| | | | |
|---|---|---|---|
| 4,855,774 | 8/1989 | Ohmura et al. | 396/6 |
| 5,517,269 | 5/1996 | Boyd et al. | 396/6 |
| 5,576,782 | 11/1996 | Kameyama | 396/6 |
| 5,581,321 | 12/1996 | Boyd | 396/535 |
| 5,805,935 | 9/1998 | Yokajty et al. | 396/6 |
| 5,815,740 | 9/1998 | Wagner | 396/6 |
| 5,828,919 | 10/1998 | Furuya et al. | 396/440 |
| 5,842,071 | * 11/1998 | Stanchus et al. | 396/440 |
| 5,897,234 | * 4/1999 | Tanaka | 396/440 |
| 5,937,209 | * 8/1999 | Person et al. | 396/6 |
| 5,970,257 | * 10/1999 | Watkins et al. | 396/6 |

* cited by examiner

Primary Examiner—David M. Gray
(74) Attorney, Agent, or Firm—Robin, Blecker & Daley

(57) ABSTRACT

A camera includes a body member (1) having a first portion (1c), a second portion (1b) and a third portion (1d) which are integrally formed. The first portion is provided for forming at least a part of a cartridge chamber into which a film cartridge is loaded, the second portion is provided for forming at least a part of a spool chamber in which a spool is disposed to wind thereon a film of the film cartridge, the third portion is provided for connection between the first portion and the second portion and is disposed behind the film in a photo-taking optical axis direction to overlap the film in the photo-taking optical axis direction while the film is transported. Accordingly, the third portion, which serves as a connection part, is arranged to have a large width in a direction perpendicular to the direction of film transport and along the surface of the film, so that the strength of the connection part can be increased.

23 Claims, 11 Drawing Sheets

CAMERA HAVING DISTORTION-RESISTANT BODY MEMBER

BACKGROUND OF THE INVENTION

1. Field of the Invention

The present invention relates to a camera having a cartridge chamber into which a film cartridge is loaded and a spool chamber in which a spool is disposed to wind thereon a film of the film cartridge.

2. Description of Related Art

Conventional cameras, as disclosed in Japanese Laid-Open Patent Applications No. HEI 8-194252 and No. HEI 8-278543 and as shown in FIG. 11, each have a spool chamber (not shown), a cartridge chamber (not shown) and a connection part 101a provided for connection between the spool chamber and the cartridge chamber. In the structure of such conventional cameras, the connection part 101a is disposed on the side of a photo-taking optical system with respect to a film transport path in a photo-taking image frame, and an aperture part 101b is formed in the connection part 101a.

However, due to the recent trend of reducing the size of cameras, a lens barrel has been becoming smaller and the length in height of cameras has been becoming shorter. Therefore, the vertical width of the connection part 101a has been becoming shorter. Further, in the case of cameras having a retractable-type lens barrel, the thickness of the connection part 101a in an optical axis direction has been becoming thinner for the purpose of minimizing the thickness of the camera with the lens barrel retracted into its stowed position. Hence, the strength of the connection part 101a in the camera body decreases accordingly. Therefore, the camera body having such weak connection part 101a tends to be distorted by an external force on a front or rear cover of the camera. Such distortion of the camera body then tends to bring about various problems, such as a focus deviation of the photo-taking optical system, inaccuracy of film transportation, etc.

BRIEF SUMMARY OF THE INVENTION

In accordance with one aspect of the invention, there is provided a camera, which comprises a body member having a first portion, a second portion and a third portion which are integrally formed, the first portion being provided for forming at least a part of a cartridge chamber into which a film cartridge is loaded, the second portion being provided for forming at least a part of a spool chamber in which a spool is disposed to wind thereon a film of the film cartridge, the third portion being provided for connection between the first portion and the second portion and being disposed behind the film in a photo-taking optical axis direction to overlap the film in the photo-taking optical axis direction while the film is transported. Accordingly, the third portion, which serves as a connection part, is arranged to have a large width in a direction perpendicular to the direction of film transport and along the surface of the film, so that the strength of the connection part can be increased.

The above and other aspects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
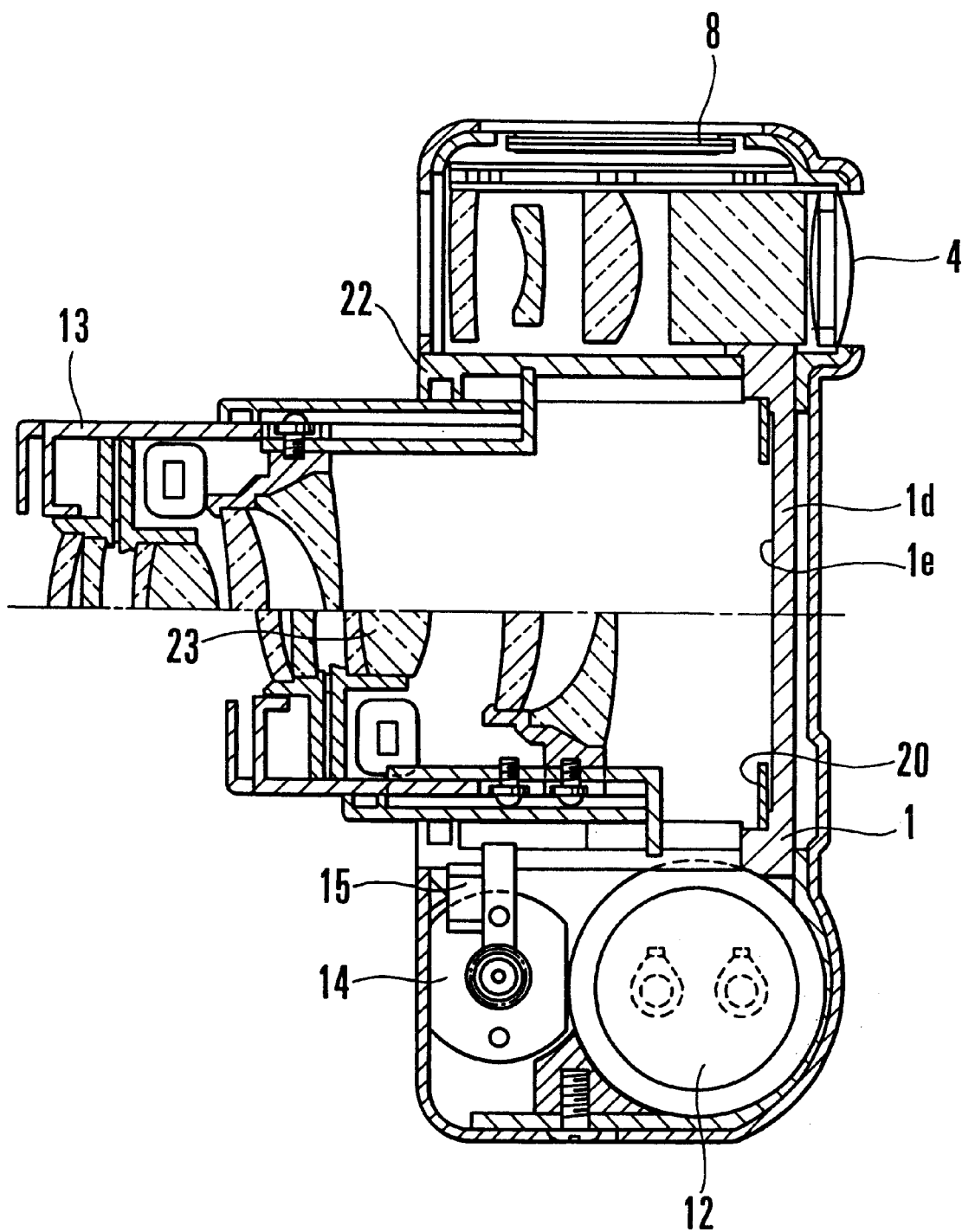
FIG. 1 is a vertical sectional view of a camera according to a first embodiment of the invention.
Figure 2:
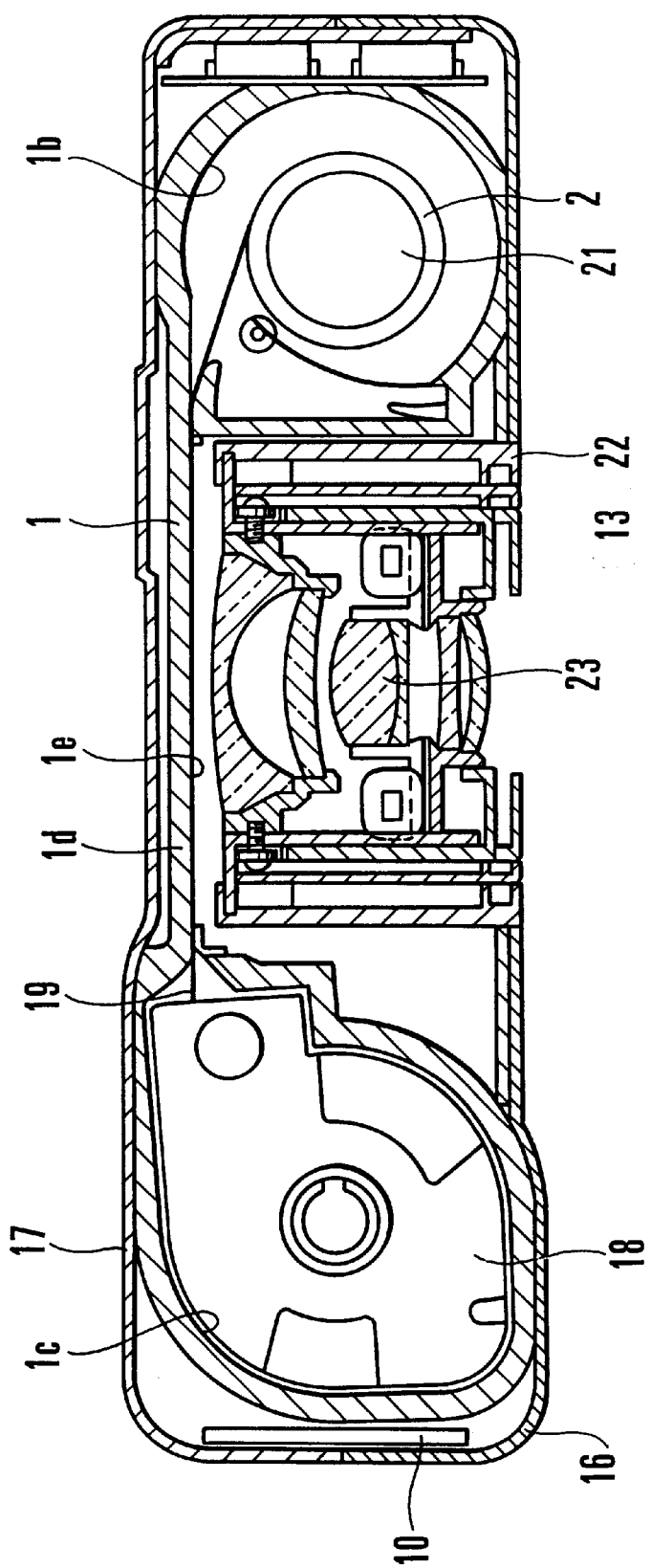
FIG. 2 is a horizontal sectional view of the camera according to the first embodiment.
Figure 3:
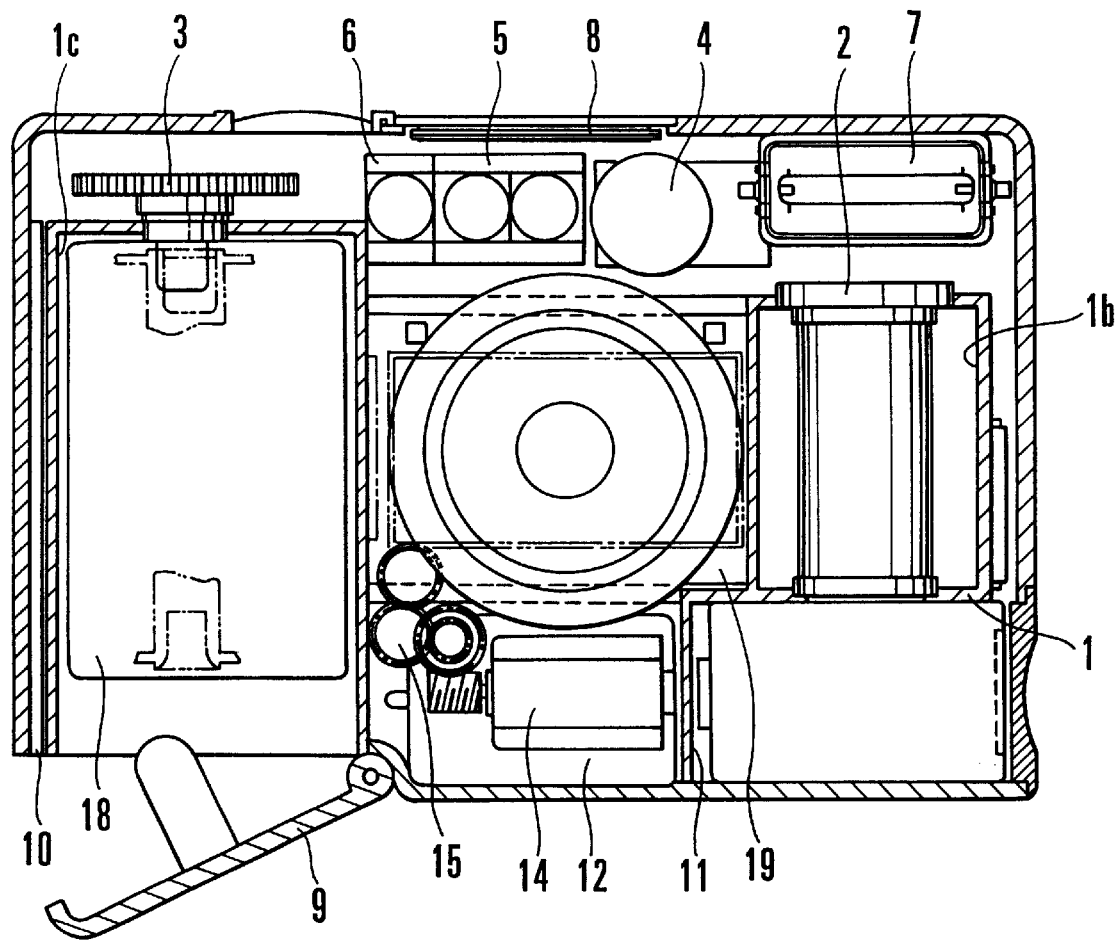
FIG. 3 is a vertical sectional view of the camera according to the first embodiment, as viewed in a cutting position different from that of FIG. 1.
Figure 4:
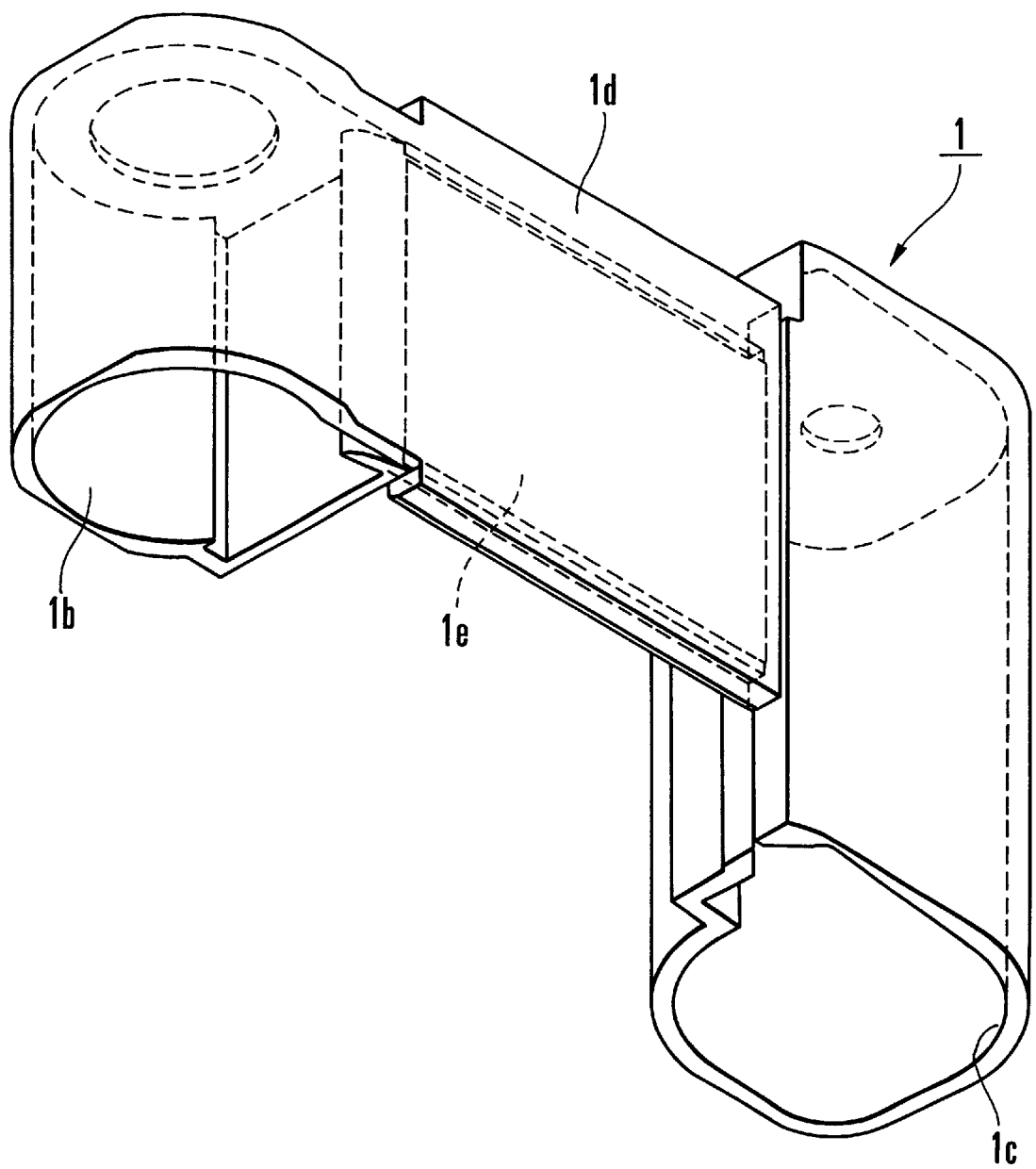
FIG. 4 is a perspective view of a body member of the camera according to the first embodiment, as viewed from below on the rear side of the camera.

FIGS. 1 to 4 relate to a first embodiment of the invention. FIG. 1 is a vertical sectional view of a camera according to the first embodiment. FIG. 2 is a horizontal sectional view of the camera. FIG. 3 is a vertical sectional view of the camera, as viewed in a cutting position different from that of FIG. 1. FIG. 4 is a perspective view of a body member 1 shown in FIGS. 1 to 4, as viewed from below on the rear side of the camera.

Referring to FIGS. 1 to 4, the body member 1 has a spool chamber 1b, a cartridge chamber 1c, a connection part 1d provided for connection between the spool chamber 1b and the cartridge chamber 1c, and a pressure plate part 1e provided for supporting a film 19 from behind. The camera is provided with, in addition to the camera body 1, a spool 2 which is rotatably supported by the spool chamber 1b, a fork 3 which is rotatably supported by the cartridge chamber 1c, a viewfinder 4, an AF (automatic focusing) sensor 5, an AE (automatic exposure) sensor 6, a flash light emission part 7 of a flash device, a display member 8 using a liquid crystal, etc., a cartridge chamber lid 9 arranged to close the cartridge chamber 1c, a hook lever 10 which is provided for keeping the cartridge chamber lid 9 in a closing position, a battery chamber 11, a main capacitor 12 for the flash device, a moving tube 13, a moving-tube driving mechanism 14, a reduction gear train 15 for the moving tube 13, a front cover 16, a rear cover 17, an aperture member 20 provided for supporting the film 19 from the front side in a photo-taking optical axis direction, a film transport motor 21, a fixed tube 22, and a photo-taking optical system 23. The film 19 is contained in a film cartridge 18, which is loaded into the cartridge chamber 1c.

As shown in FIG. 4, the body member 1 is integrally composed of the spool chamber 1b, the cartridge chamber 1c, and the connection part 1d which holds the chambers 1b and 1c at a predetermined distance. The spool chamber 1b and the cartridge chamber 1c are respectively arranged to rotatably support the spool 2 and the fork 3. A film transport mechanism (not shown) is mounted on the upper part of the connection part 1d and is arranged to transport the film 19 by transmitting a driving force of the film transport motor 21 disposed inside of the spool 2 to the spool 2 and the fork 3.

Further, the body member 1 is provided with the pressure plate part 1e, which is formed integrally with the connection part 1d to support the film 19 from behind in the photo-taking optical axis direction at an aperture plane. The aperture member 20 is fixed to the body member 1 from the front side in the photo-taking optical axis direction, and is arranged to form a tunnel part (film transport path) between the pressure plate part 1e and the aperture member 20, in such a way as to restrict the position of the film 19 in the photo-taking optical axis direction.

The moving tube 13 is arranged to hold the photo-taking optical system 23. The fixed tube 22 is fixed to a part of the spool chamber 1b and a part of the cartridge chamber 1c. The photo-taking optical system 23 which is held by the moving tube 13 is supported by the fixed tube 22 in such a way as to be movable in the photo-taking optical axis direction jointly by the moving-tube driving mechanism 14 and the moving-tube reduction gear train 15 which are mounted on the fixed tube 22.

The viewfinder 4 is fixed to the body member 1 while supporting the AF sensor 5 and the AE sensor 6. The display member 8 is supported also by the viewfinder 4 at an upper part thereof. The flash light emission part 7 is fixed to the body member 1 above the spool 2.

The cartridge chamber lid 9 is pivotally supported by the body member 1 to be openable and closable on the lower side of the body member 1. The hook lever 10, which is turnably supported on one side of the body member 1, is arranged to keep the cartridge chamber lid 9 in its closed state and to permit the cartridge chamber lid 9 to be released from the closed state by a turning operation thereof. A cartridge loading mechanism (not shown) which is fixed to the body member 1 is arranged to load or unload the film cartridge 18 according to the state of the cartridge chamber lid 9 and that of the film cartridge 18. The film cartridge 18, which contains the film 19 therein, is loaded into the cartridge chamber 1c, as described above.

The battery chamber 11 is fixed to the body member 1 on the lower side of the spool chamber 1b. The capacitor 12 is fixed to the body member 1 below the moving tube 13. The front cover 16 and the rear cover 17 are mounted on the body member 1.

In the structural arrangement of the camera described above, the connection part 1d provided for connection between the spool chamber 1b and the cartridge chamber 1c in the neighborhood of the aperture plane is located behind the surface of the film 19 in the photo-taking optical axis direction. It is, therefore, not necessary to provide any aperture opening in the connection part 1d for securing a photo-taking optical path. Hence, the strength of the connection part 1d can be prevented from being lowered by the aperture opening. Therefore, with the thickness of the body member 1 assumed to be the same as that of the body member of the conventional camera, the body member 1 has the strength equal to or greater than that of the body member of the conventional camera. Further, since the spool chamber 1b and the cartridge chamber 1c are integrally formed with the body member 1, they have the rigidity greater than that of the conventional camera.

By virtue of the above structure, the connection part 1d, which heretofore would be most easily deformable by external forces among other parts of the body member 1, can be prevented from being deformed by any external forces exerted on the front cover 16 or the rear cover 17 which is supported by the body member 1. Therefore, a film transport path which is formed between the aperture member 20 and the pressure plate part 1e to provide a space for the travel of the film 19 is never narrowed, and a distance between the spool chamber 1b and the cartridge chamber 1c is never changed to increase a load on a film transport system. The film 19 thus can be adequately transported without hindrance. The position of the moving tube 13 which is supported by the spool chamber 1b and the cartridge chamber 1c is also effectively prevented from deviating or slanting with respect to the film 19 to bring about a defocused state.

Since the connection part id is located behind the surface of the film 19 in the photo-taking optical axis direction, a pressure plate, which heretofore would be formed separately from a body member, can be formed into the pressure plate part 1e which is formed integrally with the connection part 1d. The arrangement thus permits reduction in cost and in thickness of the camera in the optical axis direction.

Another advantage of the first embodiment lies in that the structural arrangement which differs from that of conventional cameras gives a greater design latitude than the conventional cameras.

Further, since the spool 2 and the fork 3 are held directly by the body member 1 in a rotatable manner, any possible mounting error can be eliminated by the direct mounting arrangement. The error elimination enhances the accuracy and stability of film transport.

Figure 5:
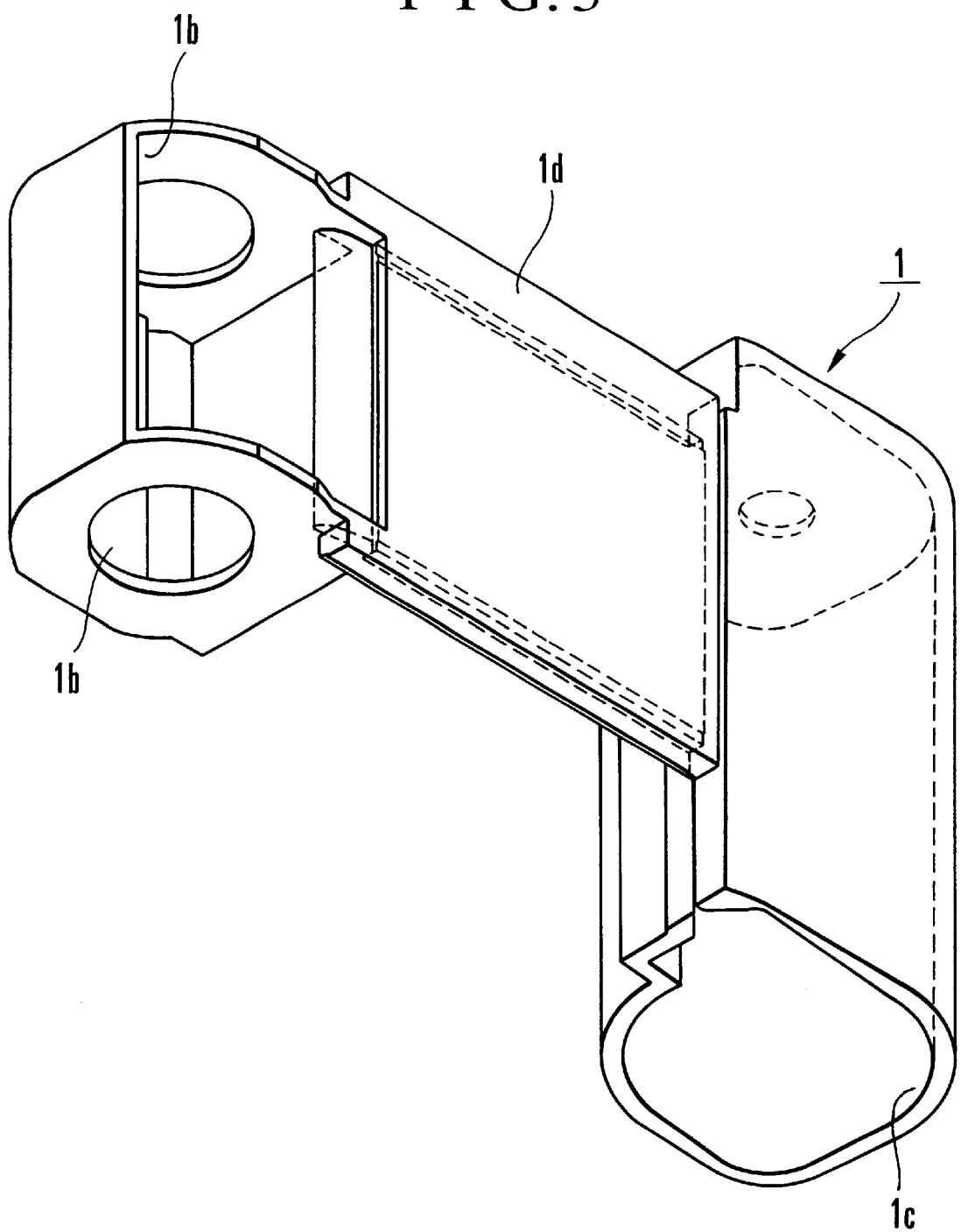
FIG. 5 is a perspective view of a body member of a camera according to a second embodiment of the invention, as viewed from below on the rear side of the camera.

FIG. 5 is a perspective view of a body member 1 of a camera according to a second embodiment of the invention, as viewed from below on the rear side of the camera. The structural arrangement of other parts of the camera is similar to that of the first embodiment and is thus omitted from illustration and description. All parts having the same functions as the corresponding parts of the first embodiment are indicated by the same reference numerals.

In the second embodiment, the upper face, lower face and outer side face of the spool chamber 1b and the upper face and periphery of the cartridge chamber 1c are formed with the body member 1. The parts of these chambers 1b and 1c which correspond to other faces, i.e., the front and rear side faces of the spool chamber 1b, are formed as opening parts. The body member 1 is thus arranged to rotatably support the spool 2 at the upper and lower parts of the spool chamber 1b and thus enhances the workability of dies in molding a film entrance part of the spool chamber 1b.

Figure 6:
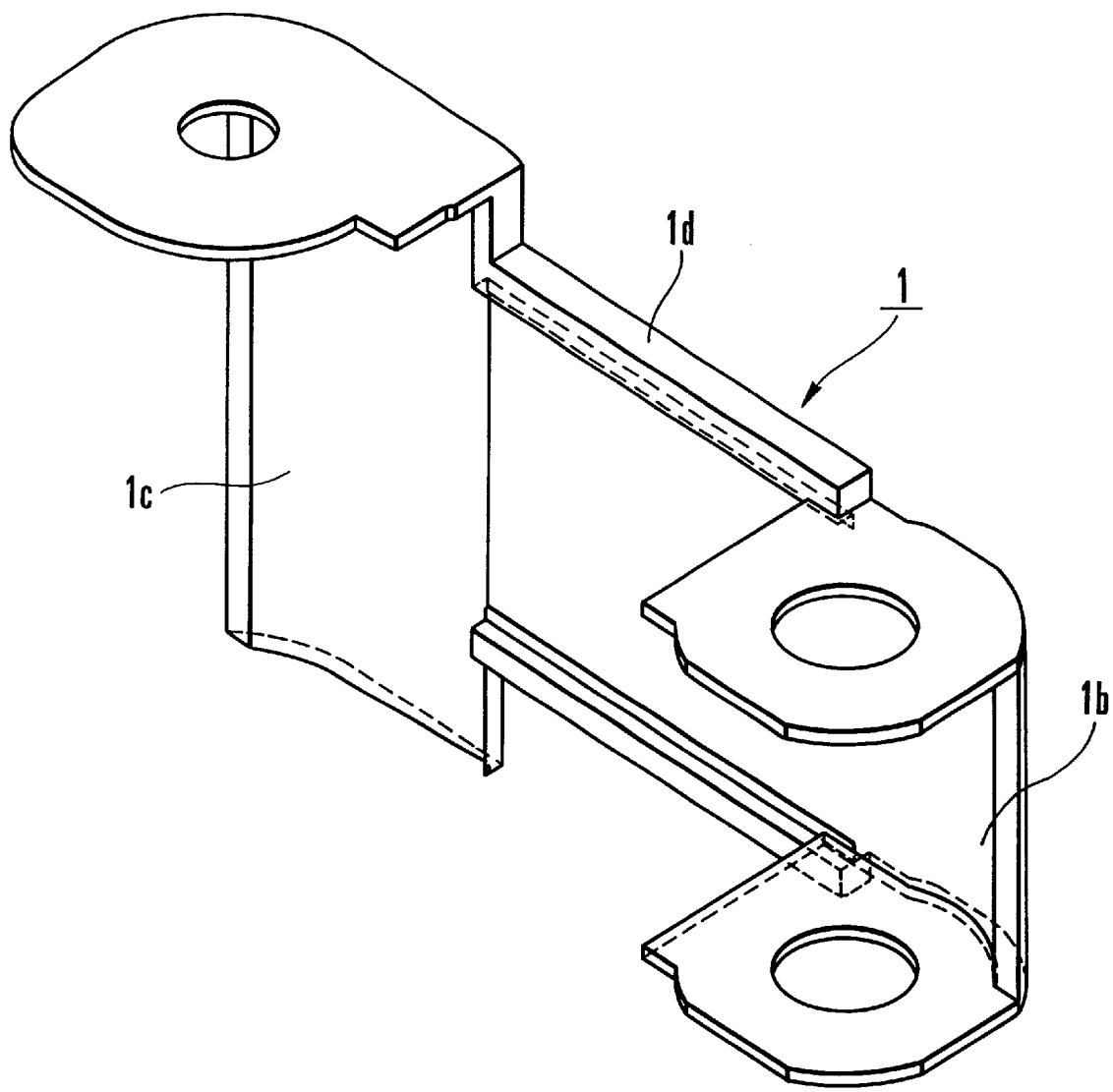
FIG. 6 is a perspective view of a body member of a camera according to a third embodiment of the invention, as viewed from above on the front side of the camera.

FIG. 6 is a perspective view of a body member 1 of a camera according to a third embodiment of the invention, as viewed from above on the front side of the camera. The structural arrangement of other parts of the camera is similar to that of the first embodiment and is thus omitted from illustration and description. All parts having the same functions as the corresponding parts of the first embodiment are indicated by the same reference numerals.

In the third embodiment, the upper face and lower face of the spool chamber 1b and the upper face of the cartridge chamber 1c are formed with the body member 1. Other parts of these chambers 1b and 1c corresponding to their other faces are formed as opening parts. By this arrangement, the fork 3 and the upper and lower parts of the spool 2 can be rotatably supported by the body member 1 without lowering its strength and rigidity. Further, the arrangement permits simplification of structure of dies for molding the body member 1 and gives more latitude to the layout of the camera.

Figure 7:
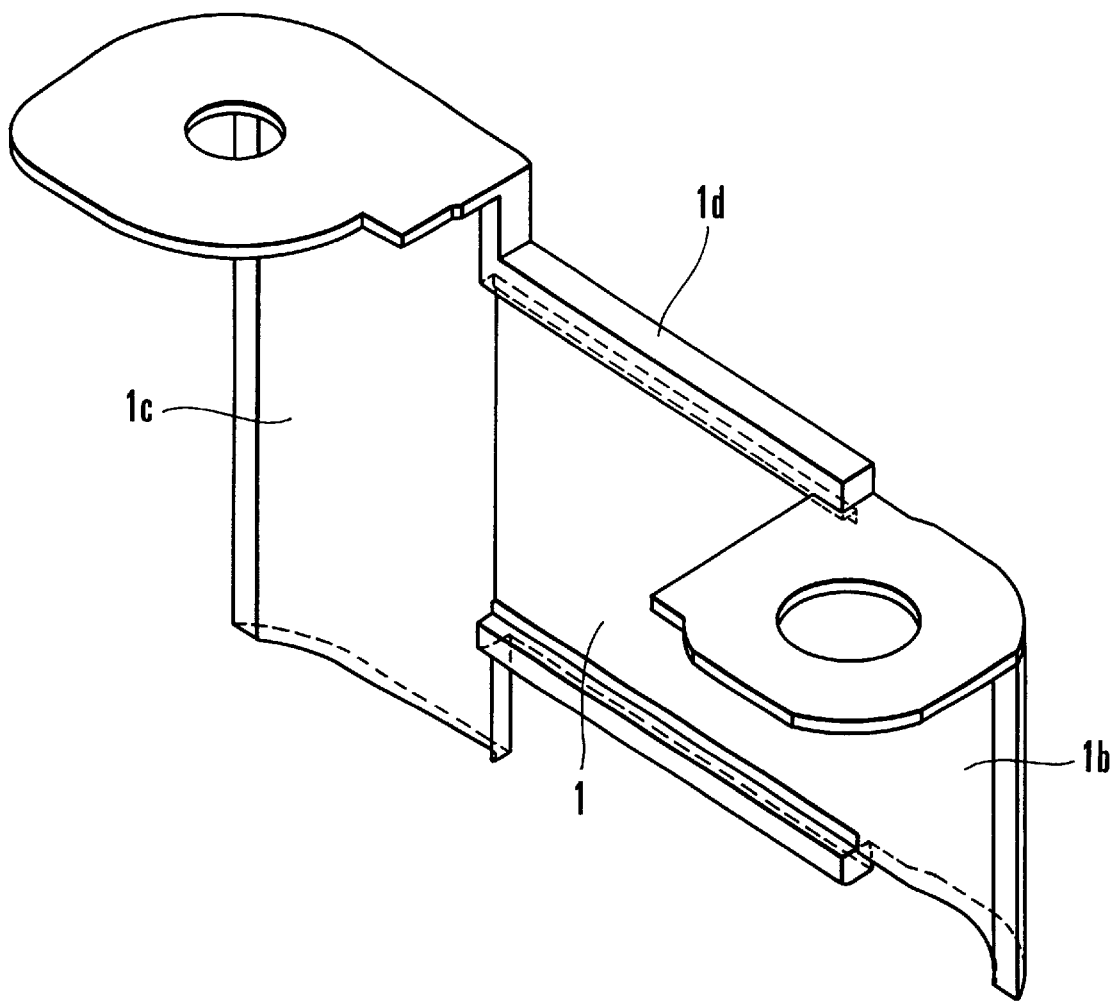
FIG. 7 is a perspective view of a body member of a camera according a fourth embodiment of the invention, as viewed from above on the front side of the camera.

FIG. 7 is a perspective view of a body member 1 of a camera according to a fourth embodiment of the invention, as viewed from above on the front side of the camera. The structural arrangement of other parts of the camera is similar to that of the first embodiment and is, therefore, omitted from illustration and description. All parts having the same functions as the corresponding parts of the first embodiment are indicated by the same reference numerals.

In the fourth embodiment, the upper face of the spool chamber 1b and the upper face of the cartridge chamber 1c are formed with the body member 1. The parts of these chambers 1b and 1c corresponding to other faces are formed as opening parts. By this arrangement, the fork 3 and the upper part of the spool 2 can be rotatably supported by the body member 1 without lowering its strength and rigidity. Further, the arrangement of the fourth embodiment also permits simplification of structure of dies for molding the body member 1 and gives more latitude to the layout of the camera.

Figure 8:
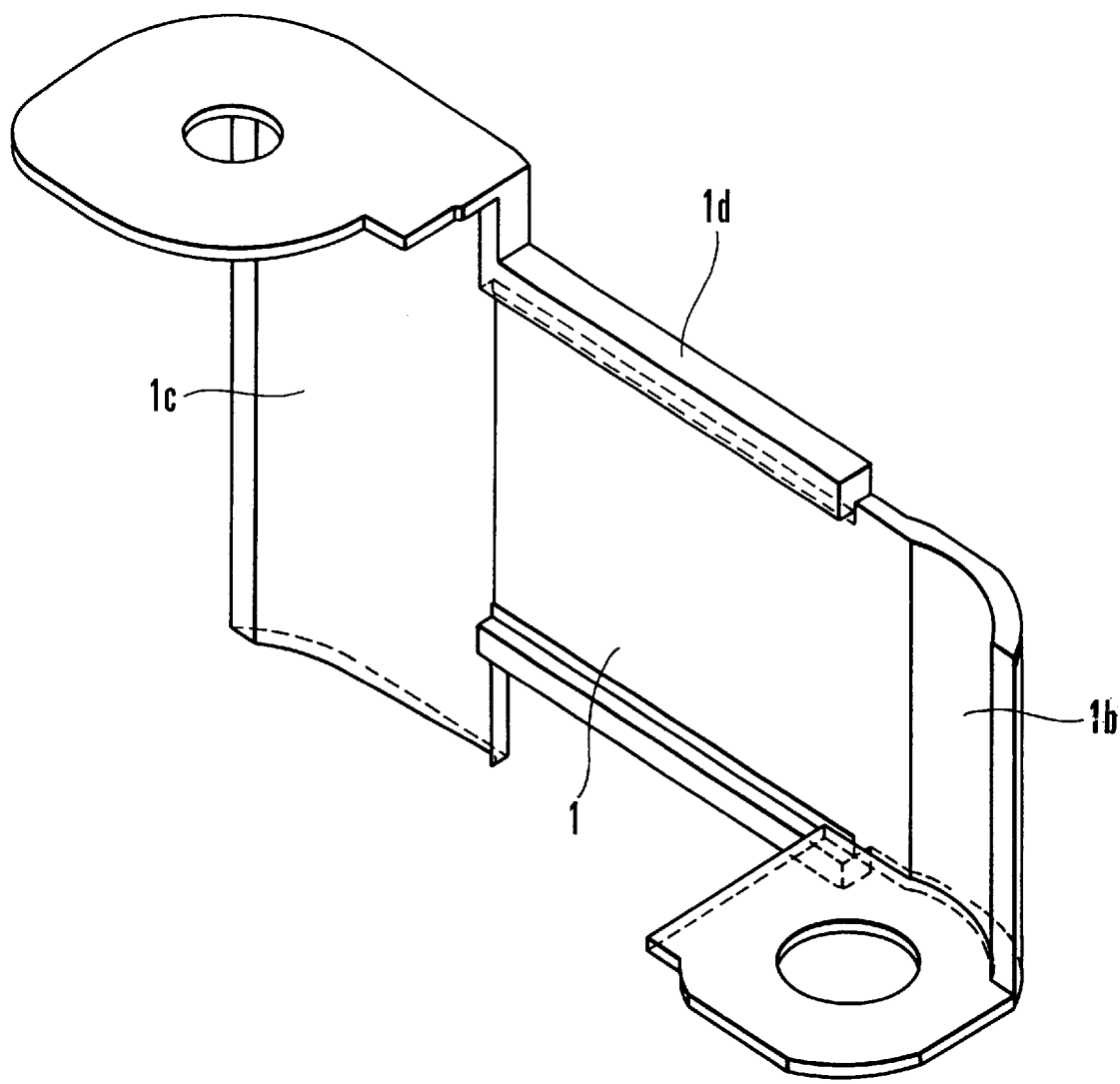
FIG. 8 is a perspective view of a body member of a camera according a fifth embodiment of the invention, as viewed from above on the front side of the camera.

FIG. 8 is a perspective view of a body member 1 of a camera according to a fifth embodiment of the invention, as viewed from above on the front side of the camera. The structural arrangement of other parts of the camera is similar to that of the first embodiment and is, therefore, omitted from illustration and description. All parts having the same functions as the corresponding parts of the first embodiment are indicated by the same reference numerals.

In the fifth embodiment, the lower face of the spool chamber 1b and the upper face of the cartridge chamber 1c are formed with the body member 1. The parts of these chambers 1b and 1c corresponding to other faces are formed as opening parts. By this arrangement, the fork 3 the lower part of the spool 2 can be rotatably supported by the body member 1 without lowering its strength and rigidity. Further, the arrangement of the fifth embodiment also permits simplification of structure of dies for molding the body member 1 and gives more latitude to the layout of the camera.

Figure 9:
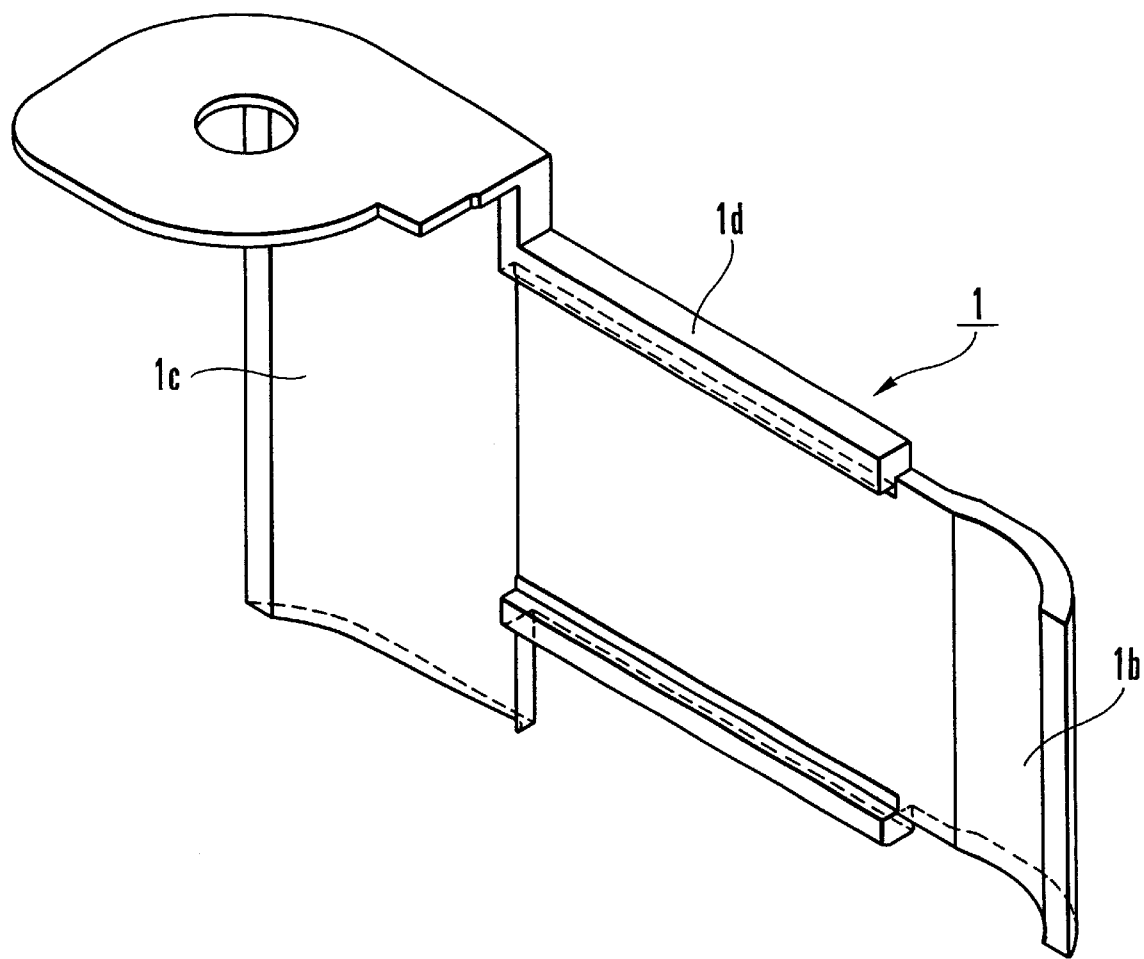
FIG. 9 is a perspective view of a body member of a camera according a sixth embodiment of the invention, as viewed from above on the front side of the camera.

FIG. 9 is a perspective view of a body member 1 of a camera according to a sixth embodiment of the invention, as viewed from above on the front side of the camera. The structural arrangement of other parts of the camera is similar to that of the first embodiment and is, therefore, omitted from illustration and description. All parts having the same functions as the corresponding parts of the first embodiment are indicated by the same reference numerals.

In the sixth embodiment, the upper face of the cartridge chamber 1c is formed with the body member 1. The parts corresponding to other faces are formed as opening parts, except that a part of the periphery of the spool chamber 1b is formed with the body member 1. By this arrangement, the fork 3 can be rotatably supported by the body member 1 without lowering its strength and rigidity. Further, the arrangement of the sixth embodiment also permits simplification of structure of dies for molding the body member 1 and gives more latitude to the layout of the camera.

Figure 10:
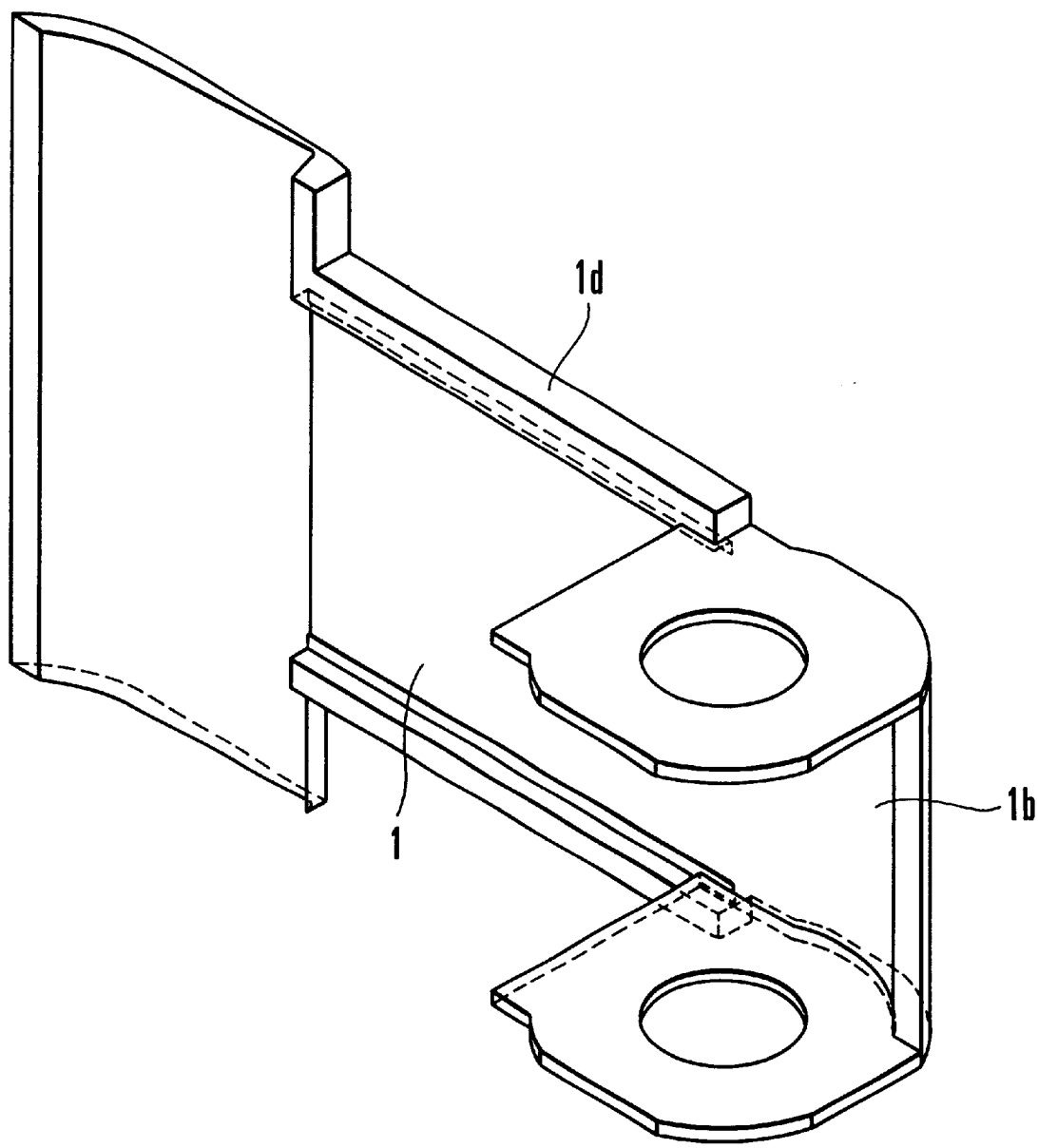
FIG. 10 is a perspective view of a body member of a camera according a seventh embodiment of the invention, as viewed from above on the front side of the camera.
Figure 11:
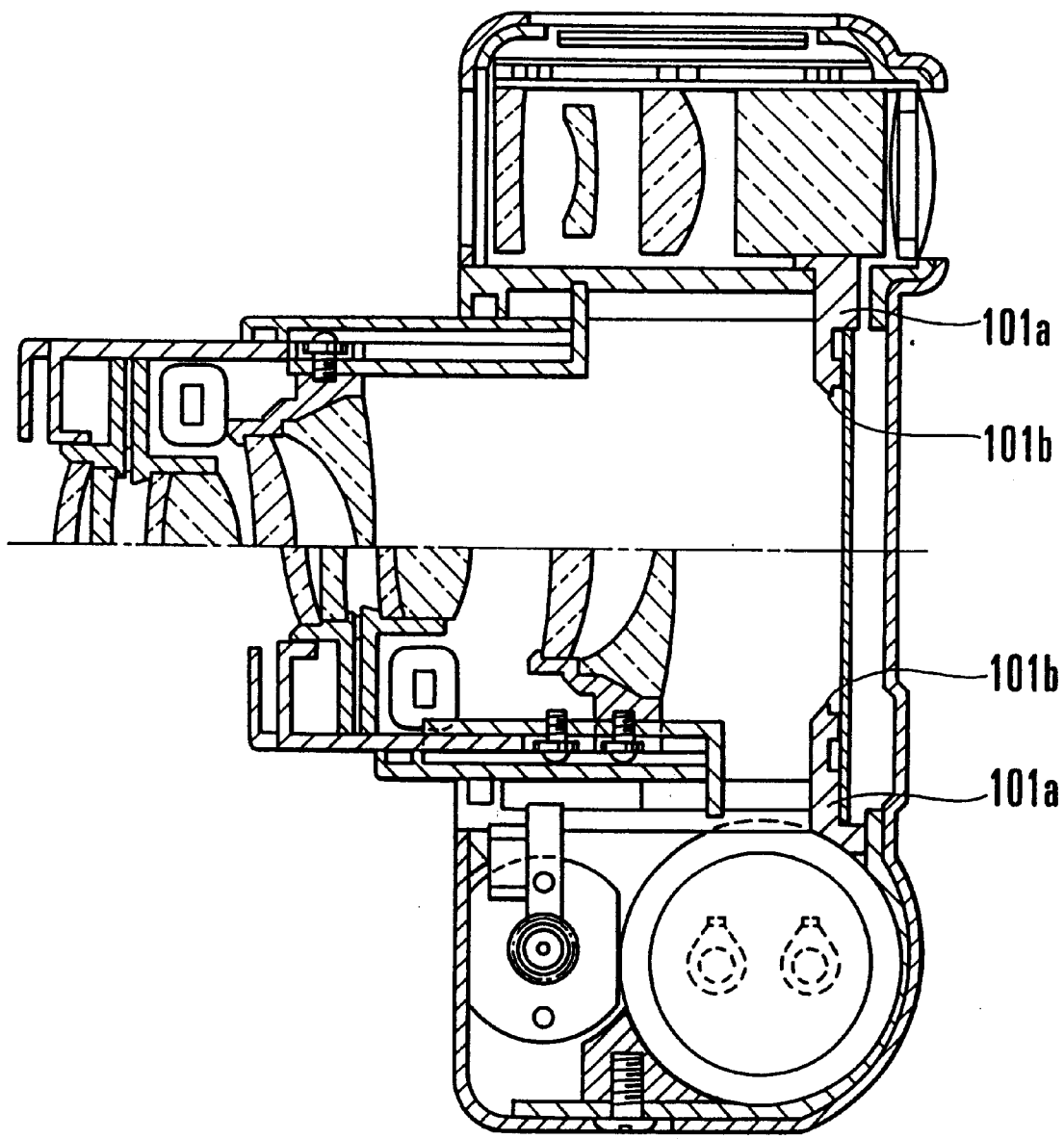
FIG. 11 is a vertical sectional view of a conventional camera.

FIG. 10 is a perspective view of a body member 1 of a camera according to a seventh embodiment of the invention, as viewed from above on the front side of the camera. The structural arrangement of other parts of the camera is similar to that of the first embodiment and is, therefore, omitted from illustration and description. All parts having the same functions as the corresponding parts of the first embodiment are indicated by the same reference numerals.

In the seventh embodiment, the upper and lower faces of the spool chamber 1b are formed with the body member 1. The parts corresponding to other faces are formed as opening parts, except that a part of the periphery of the cartridge chamber 1c is formed with the body member 1. By this arrangement, the upper and lower parts of the spool 2 can be rotatably supported by the body member 1 without lowering its strength and rigidity. The arrangement of the seventh embodiment also permits simplification of structure of dies for molding the body member 1 and gives more latitude to the layout of the camera.

Each of the body members shown in FIGS. 1 to 10 presents the advantages of the invention independently. However, the invention is not limited to these embodiments. The same advantages are attainable also by arranging other body members in accordance with the invention.

The arrangement of each of the embodiments described above enhances the rigidity of the connection part of the body member to ensure highly reliable film transport and to enable the photo-taking optical system to be stably supported. In addition to this advantage, the arrangement according to the invention permits reduction in size and cost of cameras.

According to the arrangement of each of the embodiments, a mounting error can be eliminated at least for one of a spool support member and a fork support member, so that a camera can be arranged to be capable of accurately and stably transporting a film.

According to the arrangement of each of the embodiments, it is possible not only to mold both the spool chamber and the cartridge chamber by using one and the same mold but also to have at least the upper faces of the spool chamber and the cartridge chamber formed integrally with the body member, so that the rigidity of the body member of the camera can be further increased.

According to the arrangement of each of the embodiments, the workability of dies for forming the film entrance part of the spool chamber can be enhanced without lowering the strength of the body member of the camera.

Further, the arrangement of each of the embodiments permits simplification of structure of a mold to be used in the manufacture of the body member without lowering the strength of the body member and also gives a greater latitude of layout in designing the camera.

While the invention has been described with respect to what is presently considered to be preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well known in the camera arts and their specific construction and operation are not critical to the operation or best mode for carrying out the invention.

The invention may be carried out by combining as necessary the embodiments or their technological elements described in the foregoing.

The invention applies to cases where either the whole or a part of claims or the arrangement of each embodiment disclosed forms one apparatus or is used in combination with some other apparatus or as a component element of an apparatus.

Further, the invention is applicable to cameras or various kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

What is claimed is:

1. A camera comprising:

a body member having a first portion, a second portion and a third portion which are integrally formed, said first portion being provided for forming at least a part of a cartridge chamber into which a film cartridge is loaded, said second portion being provided for forming at least a part of a spool chamber in which a spool is disposed to wind thereon a film of the film cartridge, said third portion being provided for connection between said first portion and said second portion, the third portion is a pressure plate or film support plate disposed on an opposite side of the film relative to an object being photographed, and wherein the first portion has a wall covering on the object side and having a convex surface directed toward the object, and a wall covering the opposite side relative to the object.

2. A camera according to claim 1, wherein said first portion includes a portion which movably supports a driving member for transporting the film.

3. A camera according to claim 2, wherein said first portion includes a portion which rotatably supports a fork member serving as said driving member.

4. A camera according to claim 1, wherein said second portion includes a portion which movably supports a driving member for transporting the film.

5. A camera according to claim 4, wherein said second portion includes a portion which rotatably supports a spool member serving as said driving member.

6. A camera according to claim 1, wherein said first portion includes a portion which supports a lid of said cartridge chamber for opening and closing.

7. A camera according to claim 1, wherein said third portion includes a portion provided for forming a film transport path through which the film travels while being transported, in conjunction with a member mounted on said body member from front in the photo-taking optical axis direction.

8. A camera according to claim 1, wherein said third portion includes a portion provided for forming a film transport path through which the film travels while being transported, in conjunction with a member mounted on said body member from front in the photo-taking optical axis direction and having an opening part for forming an aperture.

9. A camera according to claim 1, wherein said body member includes a fixing portion for fixing a support member supporting a photo-taking optical system.

10. A camera according to claim 9, wherein at least one of said first portion and said second portion includes said fixing portion.

11. A camera according to claim 10, wherein both said first portion and said second portion include said fixing portion.

12. A camera according to claim 9, wherein said support member includes means for movably supporting the photo-taking optical system.

13. A camera according to claim 12, wherein said support member includes means for movably supporting a holding member holding the photo-taking optical system.

14. A camera according to claim 1, wherein said body member includes a fixing portion for fixing a viewfinder.

15. A camera according to claim 14, wherein said second portion includes said fixing portion.

16. A camera according to claim 1, wherein said body member includes a fixing portion for fixing a battery chamber in which a battery is accommodated.

17. A camera according to claim 16, wherein said second portion includes said fixing portion.

18. A camera according to claim 1, wherein said cartridge chamber includes means for accommodating a film cartridge of tubular shape.

19. A camera according to claim 18, wherein said first portion includes a portion which covers a peripheral part of the film cartridge of tubular shape accommodated in said cartridge chamber.

20. A camera according to claim 18, wherein said first portion includes a portion which covers a bottom part of the film cartridge of tubular shape accommodated in said cartridge chamber.

21. A camera according to claim 1, wherein said second portion includes a portion forming a face which is parallel to a rotation axis of said spool.

22. A camera according to claim 1, wherein said second portion includes a portion forming a face which is substantially perpendicular to a rotation axis of said spool.

23. A camera comprising:

a body member having a first portion, a second portion and a third portion which are integrally formed, said first portion being provided for forming at least a part of a cartridge member into which a film cartridge is loaded, said second portion being provided for forming at least a part of a spool chamber in which a spool is disposed to wind thereon a film of the film cartridge, said third portion being provided for connection between said first portion and said second portion, the third portion is a pressure plate or film support plate disposed on an opposite side of the film relative to an object being photographed, and said second portion has a wall covering on the object side and having a convex surface directed toward the object and a wall covering on the opposite side relative to the object.

* * * * *